United States Patent [19]

Hsieh

[11] Patent Number: 5,790,221
[45] Date of Patent: Aug. 4, 1998

[54] METHOD OF MANUFACTURING A LIQUID CRYSTAL CELL

[75] Inventor: Ting-Chiang Hsieh, Chupei, Taiwan

[73] Assignee: Industrial Technology Research Institute, Hsinchu Hsien, Taiwan

[21] Appl. No.: 705,996

[22] Filed: Aug. 30, 1996

[51] Int. Cl.$^6$ ............................................. G02F 1/1337
[52] U.S. Cl. ........................ 349/126; 349/128; 349/129; 349/110
[58] Field of Search ........................... 349/123, 124, 349/125, 126, 127, 128, 129, 132, 136, 110, 188; 430/20

[56] References Cited

U.S. PATENT DOCUMENTS

| | | | |
|---|---|---|---|
| 4,662,721 | 5/1987 | Harada et al. | 349/128 |
| 4,723,839 | 2/1988 | Nakanowatori et al. | 349/128 |
| 5,237,437 | 8/1993 | Rupp | 349/117 |
| 5,453,862 | 9/1995 | Toko et al. | 349/129 |
| 5,473,455 | 12/1995 | Koike et al. | 349/132 |
| 5,504,604 | 4/1996 | Takatori et al. | 349/177 |
| 5,576,862 | 11/1996 | Sugiyama et al. | 349/124 |
| 5,638,201 | 6/1997 | Bos et al. | 349/129 |

*Primary Examiner*—William L. Sikes
*Assistant Examiner*—Tai V. Duong
*Attorney, Agent, or Firm*—Bacon & Thomas

[57] ABSTRACT

A liquid crystal cell comprises two substrates coated with respective alignment layers (polyimide layers). The upper substrate is coated with the polyimide layer but without the orientation process (rubbing process). The lower substrate coated with polyimide layer and rubbed is made by a method including the steps of a first rubbing process on the coated polyimide layer on the substrate, coating the rubbed polyimide layer with a photoresist layer, removing part of the photoresist layer to expose a portion of the rubbed polyimide layer, carrying out a second rubbing process, and then removing the remainder of the photoresist layer. The lower oriented (rubbed) substrate and the upper non-oriented (non-rubbed) substrate are then assembled together to form the liquid crystal cell to improve the scope of the viewing angle and the gray-level order problem.

9 Claims, 6 Drawing Sheets

METHOD OF MANUFACTURING A LIQUID CRYSTAL CELL

BACKGROUND OF THE INVENTION

1. Field of the Invention

This invention relates to a method for manufacturing a liquid crystal cell (LCC) for a liquid crystal display (LCD), and in particular to a method of making a two-domain twisted-nematic (TD TN) mode LCC to improve the scope of the viewing angle and the gray-level order problem.

2. Description of the Prior Art

Current planar or flat display technology includes field emission display technology, plasma display panel (PDP) technology and LCD technology. LCD being the most developed. The volume of products which use such display units, and the market value of these products, grows by several times each year, and LCD technology has proved its importance in the market. The color and quality of a thin film transistor Liquid Crystal Display (TFT LCD) has become competitive with cathode ray tube (CRT) technology. Unfortunately LCD is limited by a narrow viewing angle, so it is unable to replace CRT, CRT having the drawback of requiring a bulky and heavy housing.

In a conventional TFT LCD, the liquid crystal molecules are in the twisted-nematic (TN) mode, and the orientation of such molecules can be controlled by applying a voltage thereto, so as to control the passage of light rays through the liquid crystals. FIG. 1 illustrates the way this is done in the convention TFT LCD. Firstly, two glass substrates 3 are mounted between upper and lower polarizers 1 and 2, the phase difference between the two polarizers being 90 degrees. The liquid crystal material is sandwiched between the two substrates 3, its molecule being indicated schematically by reference numeral 4. A light beam 5 is projected through upper polarizer 1, and the liquid crystals are in the TN mode with a twist phase difference of 90 degrees, the light beam being parallel with the axis of polarization of the upper polarizer. When no voltage is applied, the light beam 5 can penetrate through the lower polarizer 2 as shown in FIG. 1a. If a voltage is applied, however, the axes of all the liquid crystal molecules 4 will be arranged in one direction, to prevent the light beam 5 from passing through the lower polarizer 2, as shown in FIG. 1b.

A LCD made of TN mode liquid crystals has intrinsic drawbacks, such as the orientation of the liquid crystal molecule causing an asymmetrical dependence of the viewing angle on the contrast, as shown in FIG. 2, where the curves indicate the contrast at different (0, 10, 30, 50 and 70 degrees) viewing angles, θ being the angle of elevation, and the horizontal viewing angle ranging from 0 to 360 degrees. The vertical axis and the horizontal axis constitute two symmetrical axes, the different viewing angles also being symmetrical, and the scope of the elevation (or depression) angle of the viewing angle reaching about 60 degrees at most. If the horizontal axis is used as the symmetrical axis, the corresponding contrast curves at different viewing angles will be asymmetrical.

As shown, points P, Q and R are located on the same curve (contrast 4), and the viewing angle at point P is about 60 degrees horizontally and 30 degrees of azimuth. The viewing angle at point R is about 37 degrees horizontally and 330 degrees of azimuth. The point S is located on the curve of contrast 5, and the viewing angle at point S is about 45 degrees horizontally, and 30 degrees of azimuth. FIG. 2 shows that the asymmetrical viewing angles would cause a grey-level order reverse.

In order to overcome this drawback of LCD, it has been proposed to use liquid crystal molecules (as shown in FIG. 3) in a two-domain (TD) TN mode, so as to improve the scope of the viewing angle. Since both the upper and lower substrates have to be processed twice to produce such a two-domain structure, the manufacturing cost and time are increased. Moreover, the alignment of the domains of the upper and lower substrates are more susceptible to error, leading to light leakage. Accordingly, such products would be uncompetitive, losing the desiderata of simplicity, low cost, low manpower requirements, and a high performance.

It is known from U.S. Pat. No. 5,478,682, the entire disclosure of which is herein incorporated by reference, that it is possible to manufacture a domain divided liquid crystal alignment film using photolithographic techniques and using a photoresist to partially protect the alignment film which is subject to a second rubbing treatment in the direction traverse to the direction of the previous rubbing treatment. A similar process is described in the Journal of the Society For Information Display, 1994, Volume 2, April, Number 1. In this paper, they manufacture the upper substrate coated with low-pretilt polyimide and the lower substrate coated with high-pretilt polyimide. The substrates are rubbed twice. Due to the different coated polyimide materials, the ability for the upper and lower substrates to grab and lease electrons is different and the image residue problem might happen.

SUMMARY OF THE INVENTION

The present invention provides a new method of making a liquid crystal cell for a liquid crystal display, the method comprising the steps of:

a. coating first (lower) and second (upper) substrates with first and second alignment layers respectively;

b. subjecting the first alignment layer (polyimide layer on the lower substrate) to an orientation process (rubbing process) so that first substrate has a pixel area divided into two domains, each domain having a specific orientation direction; and c. assembling the first and second substrates together to form the liquid crystal cell;

wherein the orientation process comprises the following steps:

a. rubbing the first alignment layer in a first direction to define a first orientation direction;

b. applying a photoresist material over the first alignment layer;

c. removing part of the photoresist material to expose a portion of the first alignment layer;

d. rubbing the exposed portion of the first alignment layer in a second direction to define a second orientation direction; and e. removing the remaining photoresist material.

The orientation process of the alignment layers (polyimide layers) in the present invention is restricted to one layer (polyimide layer on the lower substrate). The other alignment layer (polyimide layer on the upper substrate) is not subject to an alignment process.

This method is simple, the key step thereof being a simple orientation method for the first substrate and no orientation process for the other alignment layer (polyimide layer on the upper substrate). A LCC made in this way has an improved symmetry of viewing angle with contrast and an improved grey-level order. It also has a lower number of manufacturing steps and a lower manufacturing cost because it avoids the necessity to perform an orientation process on both alignment layers.

Advantageously, the first and second alignment layers are polymeric alignment layers such as polyimide alignment layers, and are coated by a spin coating method or by using a roller.

The angle between the two directions of orientation of the first alignment layer may lie within the range of from 0 degrees to 180 degrees. Preferably, said angle is 180 degrees, and the ratio of D/p is about 0.25, where P is the spinning pitch of the liquid crystals and D is the thickness of the liquid crystal cell.

DESCRIPTION OF THE PREFERRED EMBODIMENTS

Figure 1B:
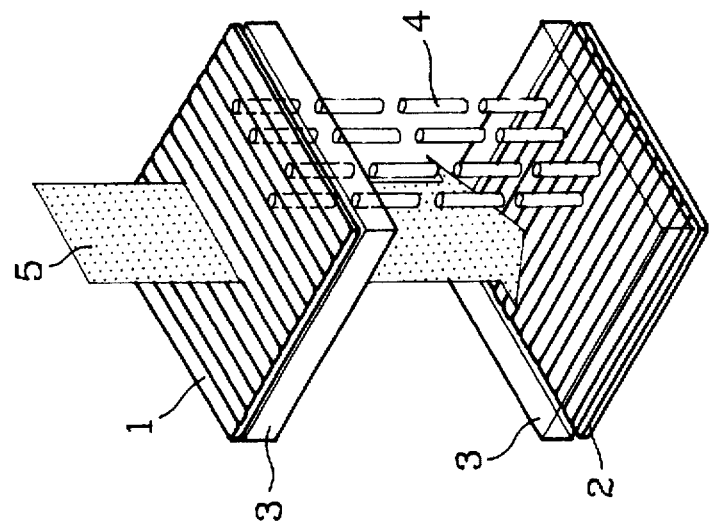
FIG. 1 is a schematic perspective view of a conventional twisted-nematic mode LCD.
Figure 1A:
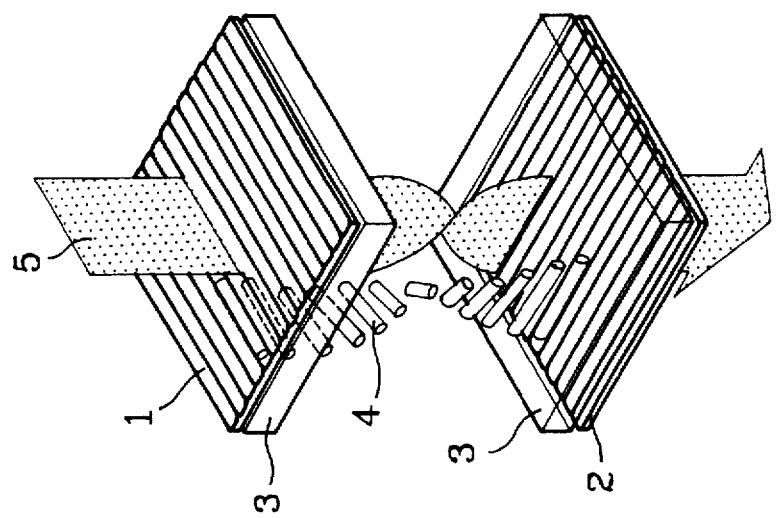
Figure 2:
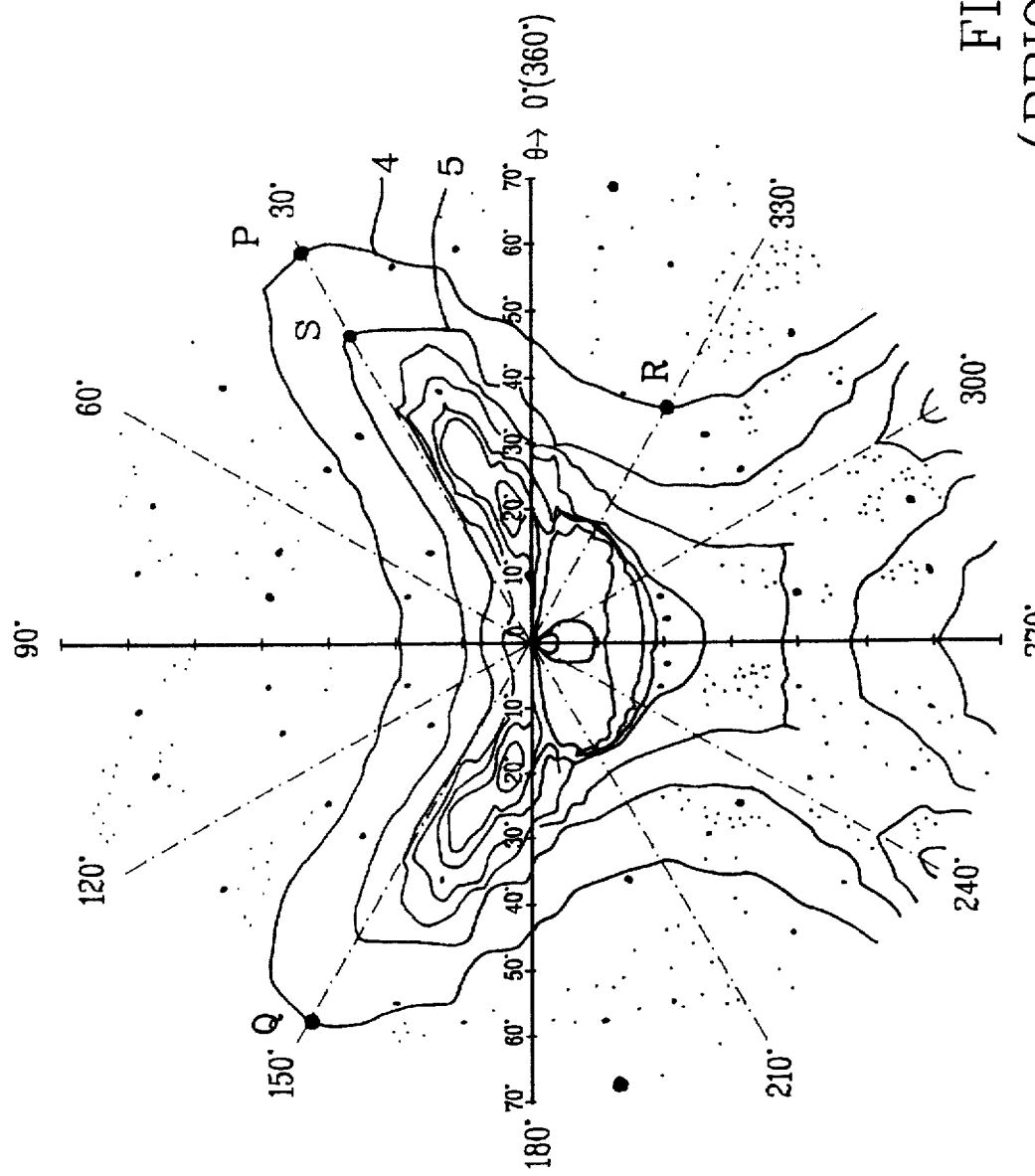
FIG. 2 illustrates different curves of contrast at different viewing angles for the LCD of FIG. 1.
Figure 3:
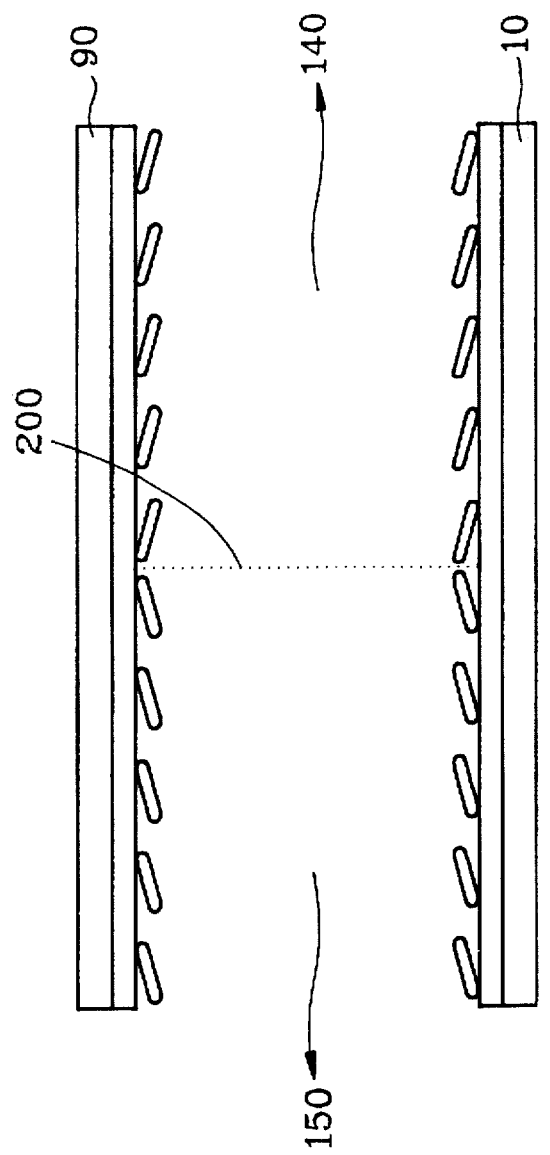
FIG. 3 is a cross-sectional view of a LCC made by means of known two-domain, twisted nematic mode LCD technology.

FIG. 4 illustrates the way in which a LCC is made in accordance with the invention. Firstly, a glass substrate 10 is selected, and this is coated with an alignment layer 20 (a polymer such as polyimide), using a roller or a spin coating method, as shown in FIG. 4a. This layer is then rubbed, using a wool cloth or an optical screen, in a first direction 70 (See FIG. 4b) to form a first pretilt director 30. A photoresist layer 40 is then applied (see FIG. 4c) on the pretilt director 30. Then as shown in FIG. 4d, part of the photoresist layer 40 is removed by etching so as to form a photoresist pattern 50.

Figure 4A:
FIG. 4 illustrates an embodiment of the present invention, showing the substrate orientation steps.
Figure 4B:
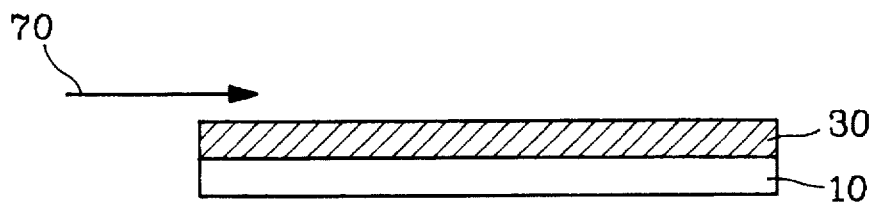
Figure 4C:
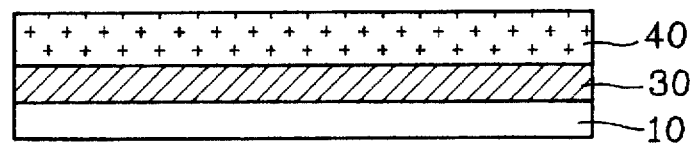
Figure 4D:
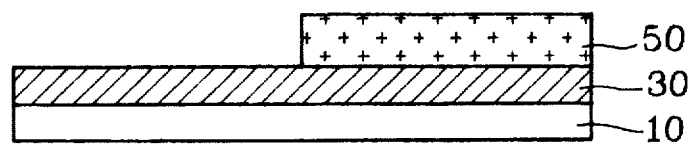
Figure 4E:
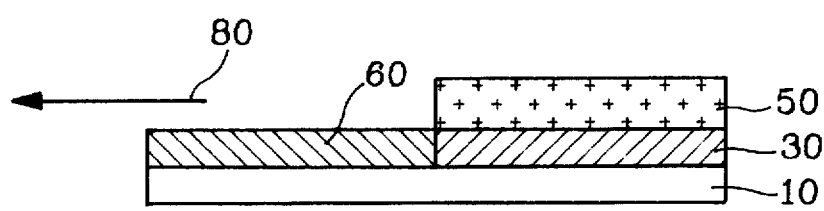
Figure 4F:
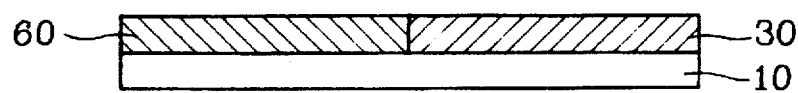

Referring to FIG. 4e, a second pretilt director 60 is formed by rubbing the exposed portion of the layer 30, using a wool cloth or an optical screen, the rubbing being carried out in a second direction 80. The photoresist layer 40 overlying the first pretilt director 30 is then removed by etching. The pretilt directors 30 and 60 are thus fixed onto the substrate 10 as shown in FIG. 4f.

Figure 5:
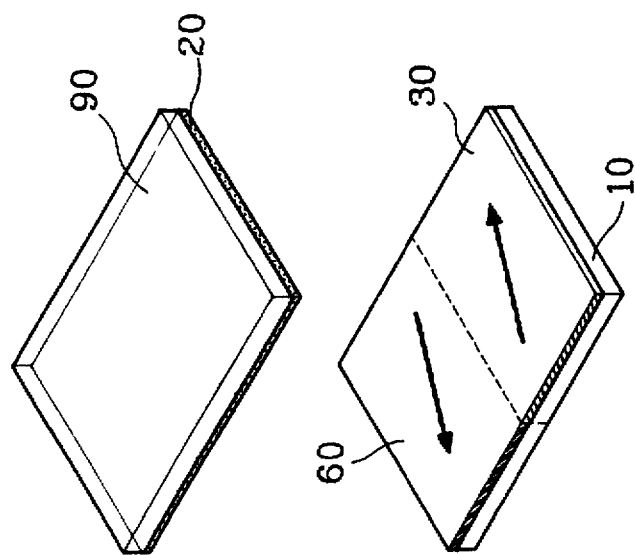
FIG. 5 is a perspective view of the embodiment showing the structure of the LCC made in accordance with FIG. 4.

FIG. 5 is a perspective view of a LCC according to the present invention, showing the lower glass substrate 10, which carries the first and second pretilt directors 30 and 60, and an upper glass substrate 90 which carries an alignment layer 20 whose molecules have not been subjected to an orientation process. The orientation of the two pretilt directors 30 and 60 can range from 0 to 180 degrees. The assembled structure with the two (upper and lower) glass substrates 10 and 90 is referred to as a LCC, wherein the orientation process for the directors 30 and 60 is such that the axes of all the molecules in each of these regions are substantially aligned in one direction.

Figure 6:
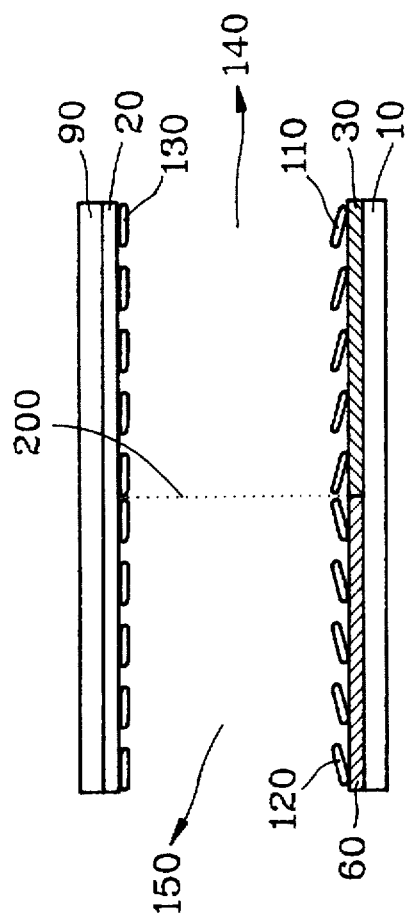
FIG. 6 is a side view of the embodiment showing the orientation of the axes of the liquid crystal molecules in the LCC.

FIG. 6 is a side view of the LCC of FIG. 5, and shows that the two different pretilt directors 30 and 60 define two liquid crystal domains 140 and 150 respectively. The axes 110 of the pretilt molecules in the domain 140 are aligned in one direction, while the axes 120 of the pretilt molecules in the domain 150 are also aligned in one direction, this direction being different from the direction of alignment in the domain 140. Moreover, the axes of the liquid crystal molecules 130 adjacent to the alignment layer 20 on the upper glass substrate 90 are not aligned in a specific direction, because this alignment layer is not subjected to orientation during processing.

As shown in FIG. 6, the lower glass substrate 10 of the LCC is provided with pretilt directors 30 and 60 having molecules oriented in different directions, the directions between the two orientations lying within the range from 0 to 180 degrees. If the difference in orientation is selected at 180 degrees, and if the liquid crystal is specially prepared, for example by using cholesterol liquid crystal nematic liquid crystals (having 0.15% to 0.3% of cholesterol liquid crystal and 99.7 to 99.85 of nematic liquid crystal), then the ratio of D/p is 0.25, where P is the spinning pitch of the liquid crystal, and D is the thickness of the LCC. The spin angle between the axes of the molecules of the liquid crystal, that is to say, the angle between the molecules contacting the lower and upper glass substrates 10 and 90, is 90 degrees.

Figure 7:
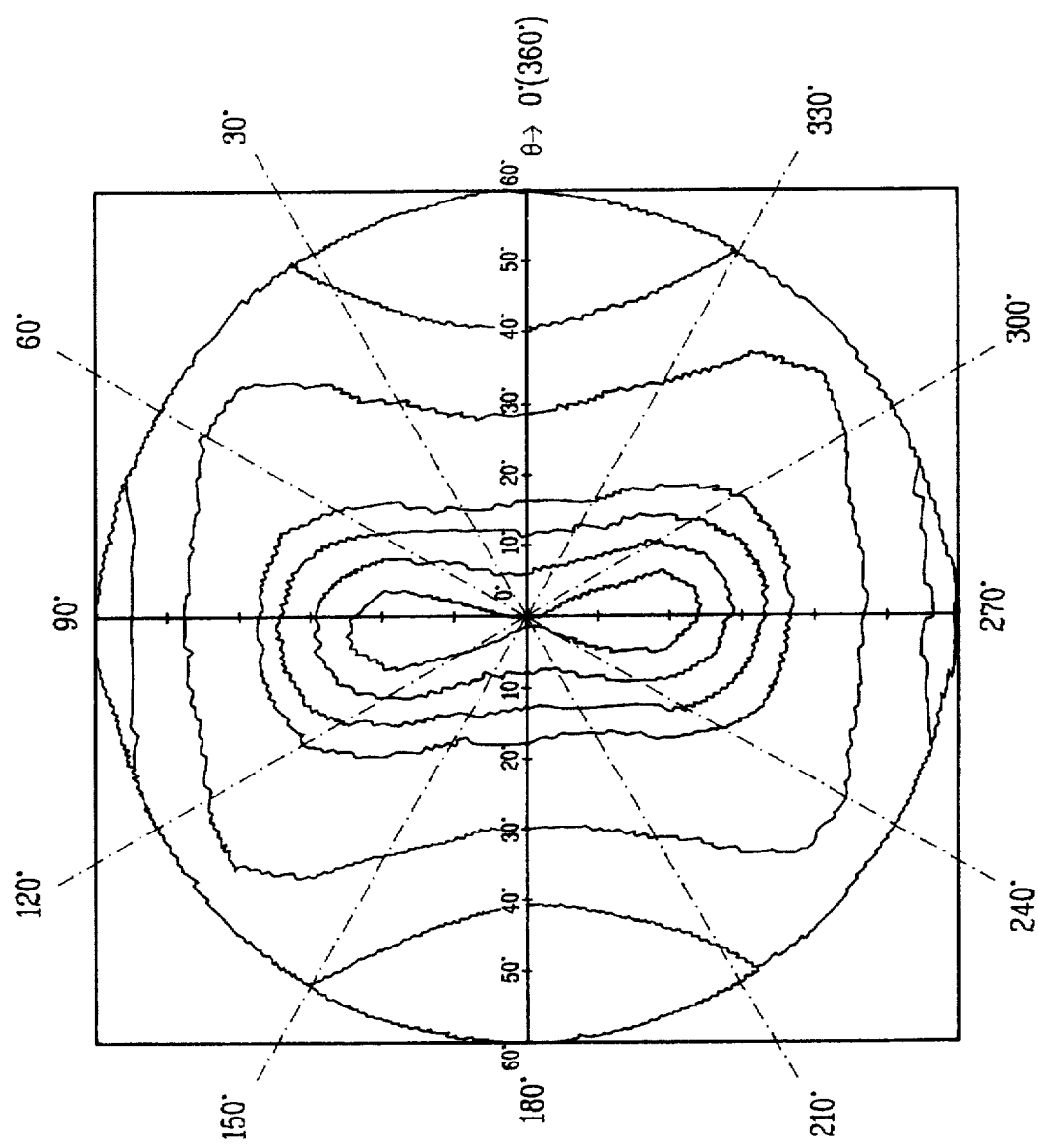
FIG. 7 illustrates different curves of contrast at different viewing angles for the embodiment.

FIG. 7 shows a symmetrical dependence of the viewing angle on the contrast for the LCC described above with reference to the FIGS. 4 to 6. In FIG. 7, the curves indicate the contrast at different (0, 20, 40 and 60 degrees) viewing angles, θ again being the angle of elevation, and the horizontal viewing angle ranging from 0 to 360 degrees. The vertical and horizontal axes constitute two symmetrical axes. It will be apparent that the contrast curves at different viewing angles are symmetrical. Thus, for the curves of contrast 5, the angle of elevation (or depression) can reach 40 degrees, and the horizontal viewing angles to both the left and the right can reach 60 degrees.

If the line 200 (See FIG. 6) which separates the domain 140 from the domain 150 is covered (for example by chromium or aluminum), light leakage will be reduced, and the scope of the viewing angles will be increased. In this case, the angle of elevation (or depression) and the horizontal viewing angle will be in excess of 60 degrees.

What is claimed is:

1. A method of making a liquid crystal cell for a liquid crystal display, the method comprising the steps of:
   a. coating first and second substrates with first and second alignment layers respectively;
   b. subjecting the first alignment layer to an orientation rubbing process so that first substrate has a pixel area divided into two domains, each domain having a specific orientation direction; and
   c. assembling the first and second substrates together to form the liquid crystal cell without performing an orientation rubbing process on the second alignment layer such that the liquid crystal molecules adjacent to the second alignment layer are aligned parallel thereto without any specific direction;

wherein the orientation rubbing process comprises the following steps:
   a. rubbing the first alignment layer in a first direction to define a first orientation direction,
   b. applying a photoresist material over the first alignment layer;
   c. removing part of the photoresist material to expose a portion of the first alignment layer;
   d. rubbing the exposed portion of the first alignment layer in a second direction to define a second orientation direction; and
   e. removing the remaining photoresist material.

2. A method as claimed in claim 1, wherein the first and second alignment layers are polymeric alignment layers.

3. A method as claimed in claim 2, wherein the first and second alignment layers are polyimide alignment layers.

4. A method as claimed in claim 1, wherein the first and second alignment layers are coated on the respective first and second substrates using a spin coating method.

5. A method as claimed in claim 1, wherein the angle between the two directions of orientation of the first alignment layer lie within a range of from 0 degrees to 180 degrees.

6. A method as claimed in claim 5, wherein said angle is 180 degrees, and the ratio of D/P is about 0.25, where P is the spinning pitch of the liquid crystals, and D is the thickness of the liquid crystal cell.

7. A method as claimed in claim 1 wherein a boundary line which separates the two domains is covered to reduce light leakage and increase the scope of the viewing angles.

8. A method as claimed in claim 7 wherein the line is covered with chromium or aluminum.

9. A method as claimed in claim 7 wherein the scope of the viewing angle, angle of elevation or depression and the horizontal viewing angle of the liquid crystal cell is in excess of 60 degrees.

* * * * *